United States Patent
Brodsack et al.

(10) Patent No.: US 11,915,866 B2
(45) Date of Patent: Feb. 27, 2024

(54) ENHANCED SAFETY COIL FOR SOGAV

(71) Applicants: Gregory J. Brodsack, Loveland, CO (US); Timothy J. Farrow, Fort Collins, CO (US); Richard J. Way, Fort Collins, CO (US); Roger M. Kifer, Fort Collins, CO (US); Michael W. Hamernik, Johnstown, CO (US); Christopher Dan Harrison, Fort Collins, CO (US)

(72) Inventors: Gregory J. Brodsack, Loveland, CO (US); Timothy J. Farrow, Fort Collins, CO (US); Richard J. Way, Fort Collins, CO (US); Roger M. Kifer, Fort Collins, CO (US); Michael W. Hamernik, Johnstown, CO (US); Christopher Dan Harrison, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/388,476

(22) Filed: Jul. 29, 2021

(65) Prior Publication Data
US 2023/0031739 A1    Feb. 2, 2023

(51) Int. Cl.
*H01F 5/02* (2006.01)
*H01F 7/08* (2006.01)
(Continued)

(52) U.S. Cl.
CPC .............. *H01F 7/081* (2013.01); *H01F 7/128* (2013.01); *F16K 31/0675* (2013.01)

(58) Field of Classification Search
CPC ....... H01F 7/081; H01F 7/128; F16K 31/0675
(Continued)

(56) References Cited

U.S. PATENT DOCUMENTS 2,947,284 A * 8/1960 Nicholson ............ F16K 31/0682
                                                          91/47
3,036,247 A * 5/1962 Kumm .................... H01F 7/081
                                                         335/281
(Continued)

FOREIGN PATENT DOCUMENTS

DE         10109378 B4      10/2004
EP         1530225 A2        5/2005

OTHER PUBLICATIONS

Woodward, Inc., "Sogav Gas Admission Solutions for Improved Engine Performance." Jun. 2019, 3 pages, Retrieved Apr. 6, 2021. URL: https://www.woodward.com/-/media/woodward/content/home-page/applications/industrial-engine/sogav/w_sogay-brochure-_-web.pdf?la=en&hash=0176E79896ACF4BE6FB89CACAB7549910BEF8B9.

*Primary Examiner* — Shawki S Ismail
*Assistant Examiner* — Lisa N Homza
(74) *Attorney, Agent, or Firm* — Reinhart Boerner Van Deuren P.C.

(57) ABSTRACT

An enhanced safety coil that prevents crack formation and propagation to the coil windings from external sources and prevents exposure to fuel is provided. The enhanced safety coil may be used in a solenoid operated gas admission valve (SOGAV), and includes a plastic encapsulation body having at least one body de-stress feature, a coil wound on the plastic encapsulation body, a sleeve forming an outermost side protective wall configured to accommodate the plastic encapsulation body and coil therewithin, and potting provided between the plastic encapsulation body and the sleeve to seal the coil therein. The body de-stress feature is configured to reduce at least one of a formation or a propagation (Continued)

of a crack through the potting to the coil. The plastic encapsulation body forms retention latches configured to mate with a stator.

22 Claims, 6 Drawing Sheets

(51) Int. Cl.
*H01F 7/128* (2006.01)
*F16K 31/06* (2006.01)

(58) Field of Classification Search
USPC ............................................. 335/282
See application file for complete search history.

(56) References Cited

U.S. PATENT DOCUMENTS

| | | | |
|---|---|---|---|
| 3,360,754 A * | 12/1967 | Gerdiman | H01F 27/2866 336/170 |
| 4,085,921 A * | 4/1978 | Ueda | F16K 31/0658 251/129.08 |
| 4,981,155 A * | 1/1991 | Pick | F16K 31/404 251/30.05 |
| 5,192,936 A | 3/1993 | Neff et al. | |
| 5,330,100 A * | 7/1994 | Malinowski | B05B 17/0607 239/585.4 |
| 5,382,933 A | 1/1995 | Nakamura et al. | |
| 5,443,093 A * | 8/1995 | Stoll | F15B 13/0853 137/596.17 |
| 5,538,220 A * | 7/1996 | LaMarca | F16K 31/0655 335/278 |
| 5,915,626 A | 6/1999 | Awarzamani et al. | |
| 6,148,862 A * | 11/2000 | Doll | B60G 17/0408 137/271 |
| 6,339,366 B1 * | 1/2002 | Meisiek | F16K 31/0651 335/282 |
| 8,013,705 B2 * | 9/2011 | Oh | F16D 27/14 336/107 |
| 8,810,346 B2 * | 8/2014 | Goubely | H01F 7/1607 335/282 |
| 8,847,716 B2 * | 9/2014 | Fonville | H01F 7/16 335/282 |
| 2005/0145812 A1* | 7/2005 | Kumar | F16K 31/10 251/129.15 |
| 2014/0232498 A1 | 8/2014 | Fonville | |

* cited by examiner

ENHANCED SAFETY COIL FOR SOGAV

FIELD OF THE INVENTION

This invention generally relates to solenoids, and more particularly to housing and encapsulation of the electrical coils of the solenoid for use in solenoid operated gas admission valves.

BACKGROUND OF THE INVENTION

Solenoid operated gas admission valves (SOGAVs) are a family of electrically-actuated, high-response gas admission valves for in-manifold (port) fuel admission. They are typically used on four cycle, turbocharged, natural gas or dual-fuel engines where one SOGAV valve is required for each cylinder. The SOGAV valve is designed as the valve portion of an overall gaseous fuel admission system delivering precise gas mass flow metering per cylinder. This enables gas engines and dual-fuel engines to operate lean burn, with increased efficiency and reduced emissions.

Because SOGAV valves provide such reliable and precise control of gas fuel admission in multipoint gas and dual-fuel engines, these SOGAV valves are used in power generation, marine, rail, and mining vehicle applications. To meet the needs of these various applications, the SOGAV valves are typically available in gas mass flow metering capacities ranging from 70 kw/cyl to 1500 kw/cyl.

In a typical SOGAV, the valve actuation forces are generated magnetically through a solenoid device. Magnetic flux generated in the solenoid attracts an armature that is attached to a low carbon steel plate (the metering plate). The solenoid produces very high forces over short travels. Typically, the valve mechanism travels 0.25 mm from full closed to full open for the SOGAV valve, although the travel distance may vary for different applications. The short travel along with the high forces result in fast and consistent opening and closing response.

Because the SOGAV valves are often used in applications that may expose them to explosive gases, the SOGAV valves, and in particular the electrical coils that form the solenoid, must be designed with enhanced safety. This is because the coil may be considered a potential ignition source due to the electric current flow therethrough when the solenoid is operated to open or close the valving member of the SOGAV valve, depending on the design application.

Previous schemes to provide this enhanced safety utilize coil windings wrapped around a bobbin encased in potting. The potting material, which is typically an epoxy resin as known in the art, provides protection of the coil windings and physically and electrically isolates them from the environment in which the solenoid is used. This physical and electrical isolation also reduces the possibility of ignition of any explosive gas that may be present in the environment in which the solenoid is operated.

Solenoid designs that use rigid epoxy resins can crack in certain application environments that may allow environmental ingress to the electrical coils. Such a crack may propagate through the epoxy resin to the coil windings themselves. Such a propagated crack of the potting could expose the electrical coils to the environment. While the electrical wire that makes up the coil winding is electrically insulated itself, possible exposure of such coil winding to the environment in which it is installed via a propagated crack through the potting is unacceptable in certain applications.

While such potting of the typical solenoid coil assembly and electrical insulation around the wire forming it provide the necessary protection and isolation for many applications, SOGAV valves are often used in applications that subject the solenoid assembly to severe mechanical vibrations and stress. Because such applications are also associated with the presence of explosive gases, an enhanced safety coil that eliminates such crack(s) is needed in such applications.

Embodiments of the present invention provides such an enhanced safety coil for use in SOGAV valves. These and other advantages of the invention, as well as additional inventive features, will be apparent from the description of the invention provided herein.

BRIEF SUMMARY OF THE INVENTION

In view of the above, embodiments of the present invention provide an enhanced safety coil for use in SOGAV and other applications that may expose the solenoid to explosive gases or otherwise requires strict environmental isolation. More specifically, embodiments of the present invention provide an enhanced safety coil that prevents crack propagation to the coil windings from external sources. Further, embodiments of the present invention provide an enhanced safety coil that prevents exposure of the electrical coil to fuel or other explosive gases or environmental ingress.

In one embodiment, the enhanced safety coil establishes barriers that prevents crack propagation from external sources and prevents exposure to fuel or other explosive gases or environmental ingress. Preferably, such barriers are established through plastic and potting.

In a further embodiment the enhanced safety coil of the present invention provides the encapsulation of the coil in a nonconductive plastic. Further, an embodiment reduces the stress in the potting adjacent to the coil. Additionally, an embodiment surrounds the coil wires with plastic which prevents crack propagation to the coil windings from external sources. Such embodiments enhance the safety of the coil design by preventing external fuels or other explosive gases or environmental ingress from contact with a potential ignition source, thus making the entire device safer. In a further embodiment, the enhanced safety coil of the present invention includes a sleeve which provides an increase of the dielectric strength.

Certain embodiments of the enhanced safety coil of the present invention have been optimized to reduce stress in the potting and to make the manufacturing processes easier including winding, potting, and assembly. Such enhanced safety coils provided by embodiments of the present invention can be incorporated in gas valves requiring enhanced safety measures or reduced exposure to fuels or other explosive gases or environmental ingress.

In another aspect, an embodiment of the enhanced safety coil of the present invention provides encapsulation of the coil while reducing the stress in the potting adjacent to the coil. Further, the enhanced safety coil of an embodiment surrounds the coil wires with plastic which will prevent crack propagation from external sources. This enhances the safety of the coil design by preventing external fuels or other explosive gases or environmental ingress from contact with a potential ignition source and thus making the entire device safer. In certain embodiments, the potting may be a standard two-part epoxy, and the plastic may be a UL recognized suitable plastic. Other potting materials and plastics may be used in other embodiments based on their operating environments.

In certain embodiments, the enhanced safety coil includes an optimized magnetic coupling and provides an increased magnetic pull force. A further embodiment of the enhanced safety coil maintains the current design envelope of other solenoids, thus increasing the magnetic power density. In certain embodiments, the addition of a sleeve allows an increase of the dielectric strength.

In certain embodiments of the enhanced safety coil of the present invention, retention latches are included in the assembly that allows for a direct insertion of the coil and locking the coil to a stator. Such embodiment allows the routing of the coil wires without getting the wires trapped between the stator and the solenoid housing. In other embodiments, an interference fit with the stator provides the fixation. In preferred embodiments, the coil assembly includes a potting friendly geometry that reduces the stress that may lead to or aid in the propagation of cracks in the potting.

In certain embodiments, fill ports and/or reservoirs are included to aid in the manufacture of the enhanced safety coil, further reducing the manufacturing time and cost. Vacuum pressure impregnation with the potting and/or wet winding of the coil may be utilized to further ensure penetration of the potting into the coil, increasing robustness and fill in embodiments.

In one embodiment an enhanced safety coil for use in a solenoid operated gas admission valve (SOGAV) includes a plastic encapsulation body having at least one body de-stress feature, a coil wound on the plastic encapsulation body, a sleeve forming an outermost side protective wall configured to accommodate the plastic encapsulation body and coil therewithin, and potting provided between the plastic encapsulation body and the sleeve to seal the coil therein. In such embodiment, the body de-stress feature is configured to reduce at least one of a formation or a propagation of a crack through the potting to the coil. In an embodiment, the plastic encapsulation body forms retention latches configured to mate with a stator.

In an embodiment, the body de-stress feature includes rounded corners on an inner side wall of the plastic encapsulation body. The body de-stress feature may also or alternatively include an outline curvature of a transition from side walls of the sleeve to each end wall of the sleeve. In such or another embodiment the body de-stress feature includes an upper end wall on at least one end of the plastic encapsulation body that is configured to extend from a top surface of the coil to form an outermost surface, displacing the potting that would otherwise cover the top of the coil. In an embodiment, the body de-stress feature includes a potting reservoir that accommodates the potting on a top surface of the coil and around at least one of a starter wire or an end wire of the coil extending therethrough.

Preferably, the plastic encapsulation body defines at least one port through the upper end wall on at least one end of the plastic encapsulation body, and wherein the potting fills the port. In an embodiment, the coil includes a wire that is positioned within at least one of the ports through the upper end wall on at least one end of the plastic encapsulation body, and wherein the potting fills the port around the wire. In an embodiment, the plastic encapsulation body defines two ports through the upper end wall on one end of the plastic encapsulation body, and in another embodiment the plastic encapsulation body defines two ports through the upper end wall on both ends of the plastic encapsulation body.

In an embodiment, a thickness of an upper side wall of the plastic encapsulation body over the coil has a reduced thickness sized to provide a barrier wall that is configured to protect the top of the coil from exposure to a crack that has propagated through the potting above the coil and accommodated between an interior side wall of the plastic encapsulation body that extends above the barrier wall and the sleeve. Preferably, the thickness of the barrier wall is between about 0.10 mm and 0.75 mm, and may be more generally up to about 3.5 mm. In one embodiment, a thickness of the sleeve is between about 0.10 mm and 0.75 mm, and may be more generally up to about 3.5 mm. In an embodiment the potting has a depth of at least about 3 mm.

In an embodiment, the potting is also provided between the sleeve and a side of the coil in a thickness WP to seal the coil therein. The thickness WP may be zero in an embodiment. In an embodiment the plastic encapsulation body completely encapsulates the coil. In one embodiment, the sleeve defines a sleeve reservoir housing forming a potting reservoir at opposite locations around a periphery of the sleeve.

In another embodiment, a coil for use in a solenoid includes an encapsulation body having at least one body de-stress feature, a coil wound on the encapsulation body, a sleeve forming an outermost side protective wall configured to accommodate the encapsulation body and coil therewithin, and potting provided between the encapsulation body and the sleeve to seal the coil therein. At least one body de-stress feature is configured to reduce at least one of a formation or a propagation of a crack through the potting to the coil and includes rounded corners on an inner side wall of the encapsulation body, an outline curvature of a transition from side walls of the sleeve to each end walls of the sleeve, and an upper end wall on at least one end of the plastic encapsulation body configured to extend from a top surface of the coil to form an outermost surface displacing the potting that would otherwise cover a top of the coil.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are illustrated multiple embodiments of an enhanced safety coil constructed in accordance with the teachings of the present invention. While the following will describe such an enhanced safety coil in the operating environment of a solenoid operated gas emission valve (SOGAV), those skilled in the art will recognize from the foregoing and following description that such enhanced safety coils described herein may be utilized in multiple environments in which crack propagation and environmental or fuel ingress is to be prevented and/or mitigated. As such, the following description should be taken by way of example and not by way of limitation.

Figure 1:
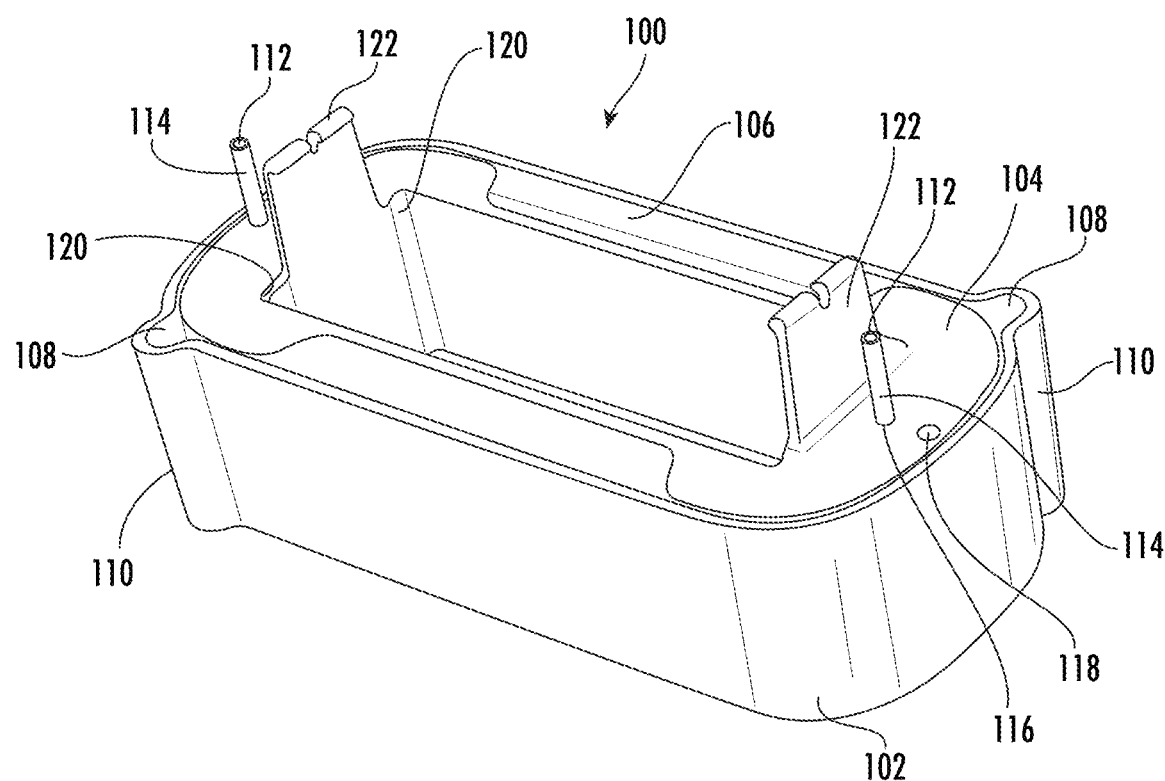
FIG. 1 is a perspective view illustration of an embodiment of an enhanced safety coil constructed in accordance with the teachings of the present invention.

With reference now to FIG. 1, there is illustrated an embodiment of an enhanced safety coil assembly 100 constructed in accordance with an embodiment of the present invention. Such an enhanced safety coil assembly 100 includes a plastic sleeve 102 forming an outermost side and bottom protective wall of the enhanced safety coil assembly 100. While the plastic material utilized to form the sleeve 102 may be any suitable plastic, in certain embodiments the material chosen also provides a high dielectric strength.

The sleeve 102 accommodates a plastic encapsulation body 104 and serves to retain potting 106, which each serve to protect the electrical coil (not shown) encased therein. The plastic encapsulation body 104 may be formed as an elongated oval or other geometric shape to accommodate the coil for a particular application. The material selected for the plastic encapsulation body 104 may also be any approved plastic composition selected based on operating environment and application. The material for the potting 106 may also be selected based on operating conditions and applications, it is typically a standard two-part epoxy utilized in electrical assemblies, e.g. to provide the potting of solenoid coils.

In order to simplify manufacturing and reduce cost, the sleeve 102 also includes a sleeve reservoir protrusion 110 that forms a potting reservoir 108 therein. During the manufacturing process, these potting reservoirs 108 may be utilized to fill the partial assembly with the potting material prior to cure. Such manufacturing process may utilize a vacuum pressure impregnation process in which the potting material is introduced in one of the potting reservoirs 108 and is drawn to the other throughout the interior volumes (not shown) within the sleeve 102 once the coil and plastic encapsulation body 104 have been positioned therein.

As may also be seen in this FIG. 1, the coil wire 112 surrounded by its insulation 114 may enter the plastic encapsulation body 104 at a coil starter wire inlet port 116. While not shown in this FIG. 1, the coil wire 112 is then wound within the plastic encapsulation body 104 to form the solenoid coil. In the embodiment illustrated in FIG. 1, the wire 112 exits the plastic encapsulation body 104 on the end of the enhanced safety coil assembly 100 opposite the starter coil wire inlet port 116 in which the coil wire 112 enters the plastic encapsulation body 104 via the coil end wire outlet port 118 on that opposite end.

FIG. 1 also illustrates the existence of a second coil end wire outlet port 118 on the same end as the coil starter wire inlet port 116 in which the coil wire 112 enters the plastic encapsulation body 104. While not visible in FIG. 1, the opposite end of the enhanced safety coil assembly 100 also includes a second coil starter wire inlet port 116. These multiple ports 116, 118 on each end of the plastic encapsulation body allow for various coil winding configurations that allow for the starter wire and end wire to enter and exit the assembly on opposite ends, on the same end, or in reverse order for both options. The unused ports 116, 118 are simply filled with the potting 106 as part of the potting process once the coil configuration has been determined and installed within the plastic encapsulation body 104. Of course, such unused ports may be excluded in other embodiments where such flexibility is not needed.

FIG. 1 also illustrates some of the body de-stress features formed in the sleeve 102 and the plastic encapsulation body 104. These body de-stress features visible in this FIG. 1 include the rounded corners 120 on the inner side wall of the plastic encapsulation body 104 and the outline curvature of the transition from the sides to the ends of the sleeve 102. Both of these body de-stress features are formed so as to minimize the amount of stress that is communicated or applied to the potting 106 within the enhanced safety coil assembly 100 so as to minimize the exacerbating factors of crack formation and propagation therein. Other body de-stress features will be discussed more fully below.

Depending on the application in which the enhanced safety coil assembly 100 is used, the plastic encapsulation body 104 may also form retention latches 122 that allow the enhanced safety coil assembly 100 to be affixed to a stator on which the enhanced safety coil assembly is mounted. Other mounting structures, such as that illustrated in the embodiment shown in FIG. 8 as retention latch 122' may also or alternatively be utilized based on the design configuration on which the enhanced safety coil assembly 100 will be mounted. Further, because of the material properties of the plastic encapsulation body 104, the interior opening dimensions may be designed such that an interference fit may provide the required securement to the stator or other structure on which the enhanced safety coil assembly 100 is mounted.

Figure 2:
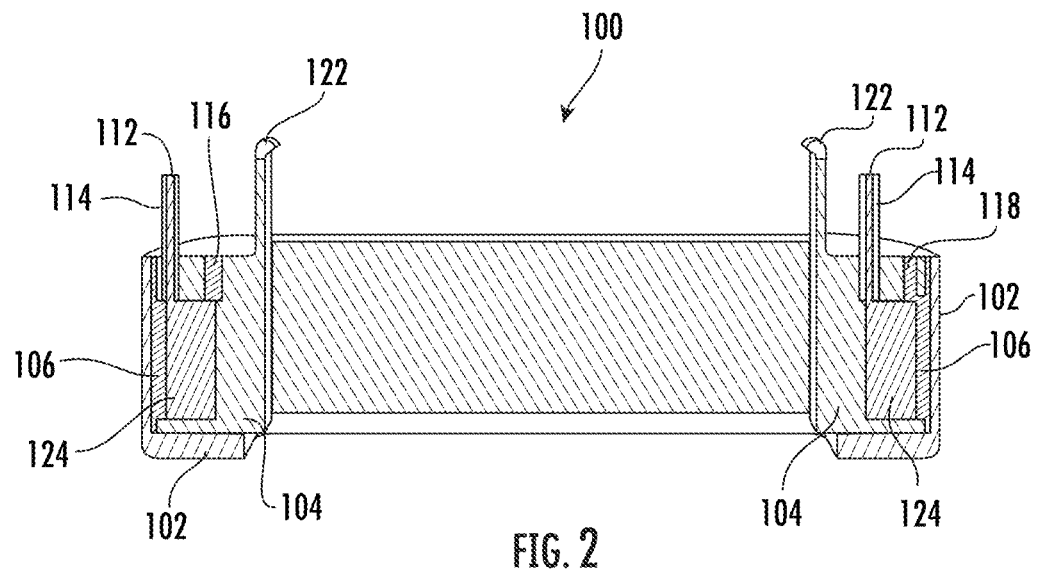
FIG. 2 is a cross-sectional perspective view illustration taken along a longitudinal axis of the embodiment of the enhanced safety coil of FIG. 1.

Turning to FIG. 2, a cross-section of the enhanced safety coil assembly 100 of FIG. 1 taken through the middle along its longitudinal axis is provided to illustrate the internal features not visible in the perspective view of FIG. 1. As may be seen from this longitudinal cross-section, the sleeve 102 forms not only an exterior side wall, but also a bottom wall extension that cooperates with a bottom wall of the plastic encapsulation body 104 to fully enclose the coil 124 wound thereon.

The upper end wall on each end of the plastic encapsulation body 104 extends from the top surface of the assembly 100 to the top surface of the coil 124 so as to displace the potting that would otherwise cover the top of the coil 124 in a typical coil assembly, other than the potting 106 that fills the unused coil starter wire port 116 and coil end wire port 118. This body de-stress feature further enhances the safety of the assembly 100 by replacing the potting, in the highly stressed corner areas at the ends of the coil and the end areas through which the starter and end wires protrude, with the plastic material of the plastic encapsulation body 104. In a typical coil assembly, these areas are prone to cracks in the potting, the propagation of such to the coil surface is to be avoided.

As may also be seen, the embodiment illustrated in FIG. 2 also includes an area between the sidewall of sleeve 102 and the coil 124 in which potting 106 is provided. If a crack were to occur in this area of the potting, the sleeve 102 would prevent propagation there to the environment. As mentioned above, this potting 106 also fills the unused coil starter wire inlet port 116 and the unused coil end wire outlet port 118, i.e. the areas within the enhanced safety coil assembly 100 not fully occupied by the plastic encapsulation body 104, the wire 112 and its insulation 114, or the coil 124 itself.

Figure 3:
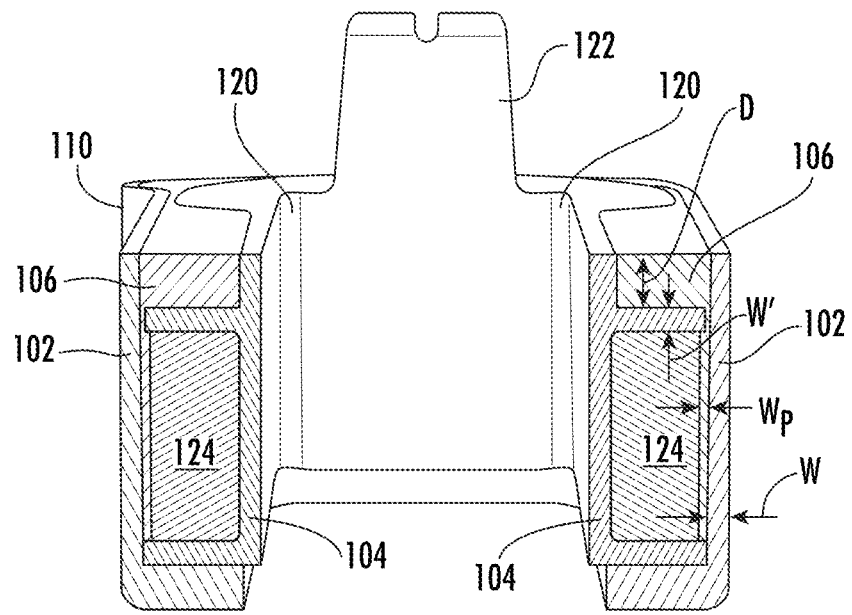
FIG. 3 is a is a cross-sectional perspective view illustration taken along a transverse axis of the embodiment of the enhanced safety coil of FIG. 1.

FIG. 3 illustrates a cross-section of the embodiment of the enhanced safety coil assembly 100 of FIG. 1 taken along an axis transverse to the longitudinal axis about which the cross-section of FIG. 2 was taken. As may be seen in this transverse cross section, the thickness of the upper side wall of the plastic encapsulation body 104 over the coil 124 is reduced to a thickness W'. This thickness is sized to provide a barrier wall that protects the top of the coil 124 from exposure to a crack that could propagate through the potting 106 thereabove. This potting 106 is accommodated between the interior side wall of the plastic encapsulation body 104 that extends above the barrier wall and the sleeve 102.

The depth D of the potting 106 above the coil 124 and the upper side wall of the plastic encapsulation body 104 (which is also the height of the interior side wall of the plastic encapsulation body 104 formed by the reduction in thickness compared to the upper end wall of the plastic encapsulation body 104 discussed above) may vary based on the operating environment, and is preferably at least 3 mm in depth in order to enable its usage in certain explosive gas environments. The width W of the sleeve 102 may also vary depending on the application and material chosen, and in the present embodiment is preferably between about 0.10 mm and 0.75 mm, and may be more generally up to about 3.5 mm, in order to provide adequate mechanical protection and dielectric strength.

While the embodiment illustrated in this FIG. 3 includes potting 106 around the exterior of the coil 124 within the sleeve 102, the width $W_P$ of this potting 106 can vary depending on the isolation requirements of the operating environment, the width W and material composition of the sleeve 102, etc. since it is within the sleeve 102. Indeed, this width $W_P$ can be as small as zero and as large as the housing envelope requirement would allow.

The width W' of the upper side wall of the plastic encapsulation body 104 above the coil 124 may also vary in the same range as the width W of the sleeve 102, although the two measurements need not be the same, even in those embodiments where the material of the sleeve 102 and the plastic encapsulation body 104 is the same. Indeed, the width of the plastic encapsulation body 104 on the side of the coil 124 forming the interior wall of the enhanced safety coil assembly 100 may be larger than approximately 0.10 mm in order to provide an interference fit with the structure on which the enhanced safety coil assembly 100 is mounted as an alternative to inclusion of retention latches 122, or as an enhancement thereto.

Figure 4:
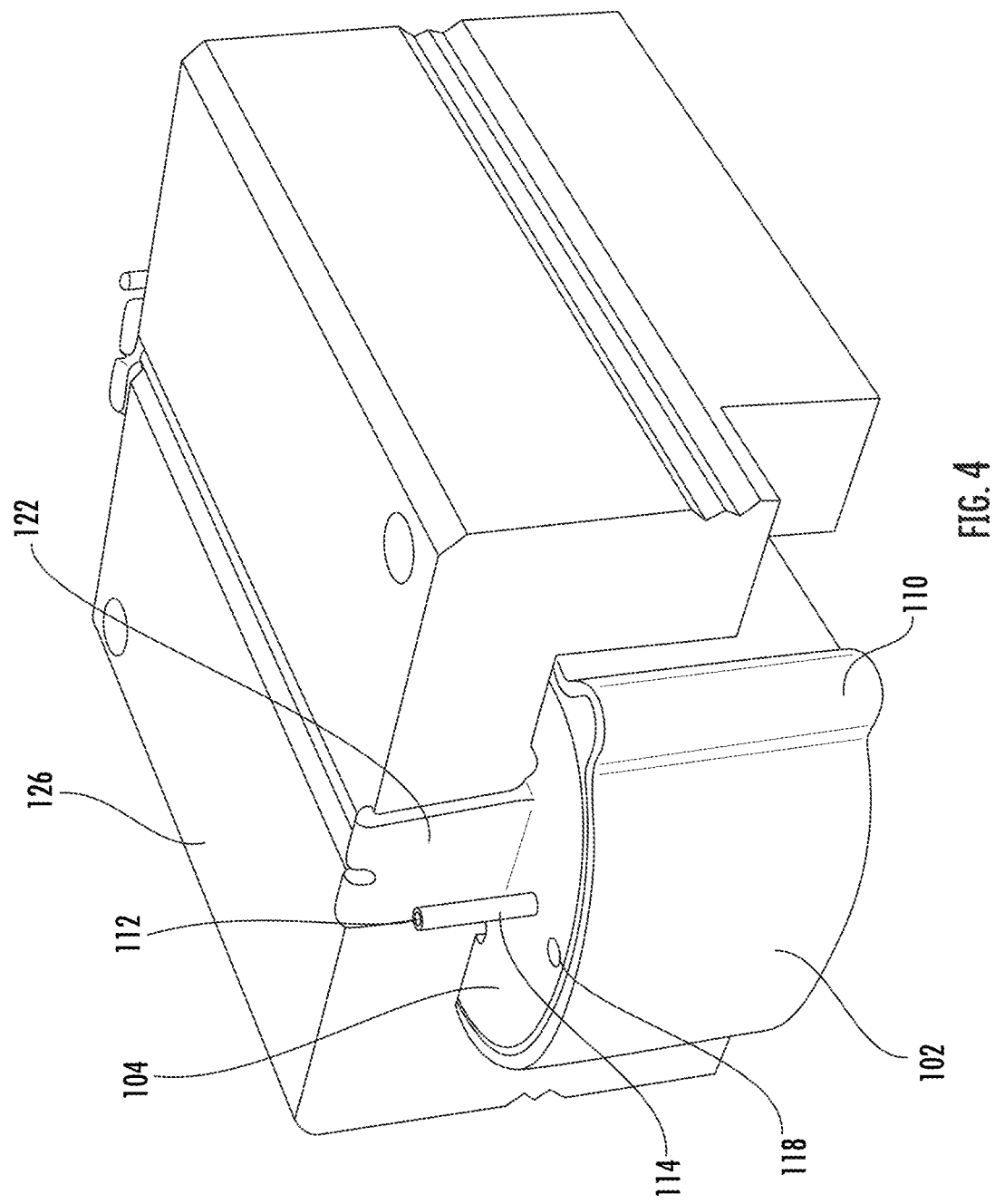
FIG. 4 is a perspective view of the embodiment of the enhanced safety coil of FIG. 1 latched to a stator for use in a SOGAV.

Indeed, FIG. 4 illustrates such mounting of the enhanced safety coil assembly 100 on a stator 126 used in an embodiment of a solenoid operated gas admission valve (SOGAV). As may be seen in this embodiment, the retention latches 122 extend to the top edge of the stator 126 and latch over the edge thereof to hold the enhanced safety coil assembly 100 in place to aid in further assembly of the SOGAV.

Figure 5:
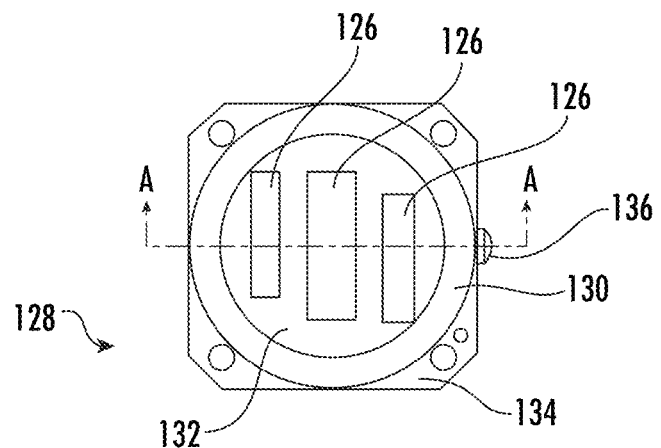
FIG. 5 is a top view illustration of an embodiment of the enhanced safety coil encased within epoxy constructed in accordance with the present invention assembled on an exemplary solenoid.

Turning now to FIG. 5, there is illustrated a top view of an embodiment of a solenoid assembly 128 utilizing an enhanced safety coil constructed in accordance with the teachings of the present invention. As may be seen from this FIG. 5, a circular coil assembly housing 130 is part of a SOGAV control electronics housing 134, which includes the coil energization and control circuitry to provide and remove the electric current flow to the enhanced safety coil. The connection of the control and power wires (not shown) to the solenoid assembly 128 is via the electrical connector (not shown). FIG. 5 also illustrates that within the coil assembly housing 130 is the coil housing two-part epoxy 132 that surrounds the legs of the stator 126.

Figure 6:
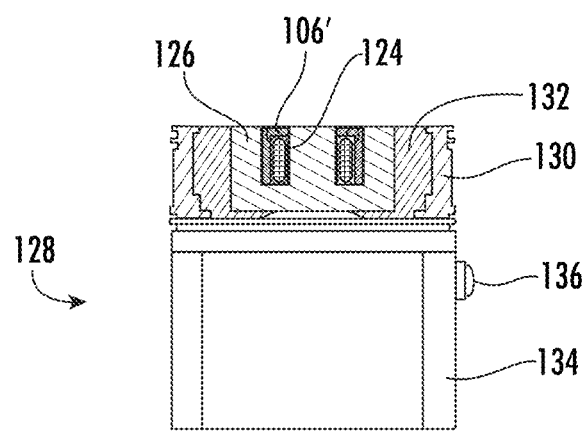
FIG. 6 is a cross-sectional view along section A-A of the embodiment of the enhanced safety coil of FIG. 5.
Figure 7:
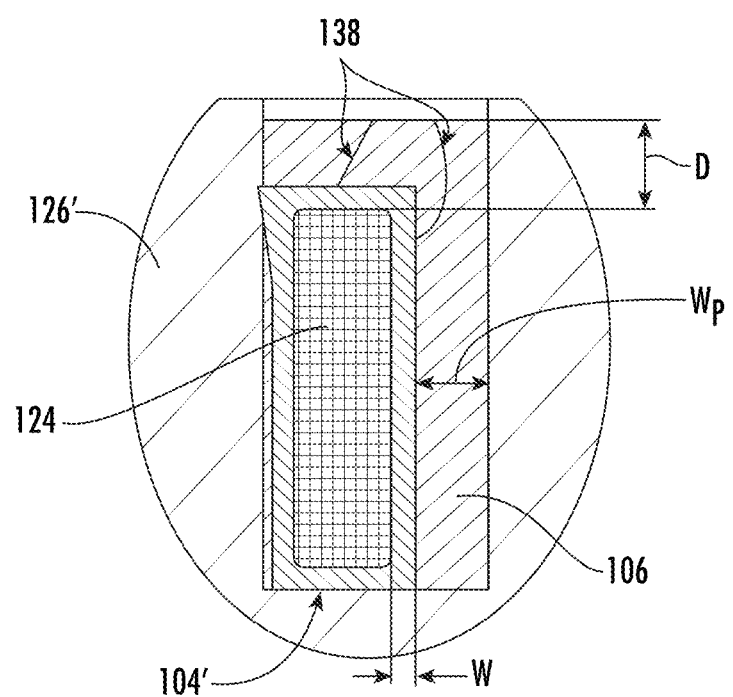
FIG. 7 is an enlarged detail view of the detail-A area of FIG. 6 (fully encapsulated)

The cross-section illustration shown in FIG. 6 taken along section A-A of FIG. 5 is provided to illustrate the internal construction of an alternative embodiment of the enhanced safety coil assembly for use in an operating environment, the description of which will refer to the detail as shown in expanded form in FIG. 7, to which attention is now directed.

As may be seen in this alternative embodiment, the coil 124 is fully encased by the plastic encapsulation body 104'. As such, in other embodiments that retain it, the sleeve may be thinner than in the previously discussed embodiments in view of the width W of the plastic encapsulation body 104 satisfying the insulation requirements of the coil 124. The depth D and the width $W_P$ of the potting 106 are also shown in this FIG. 7, and may vary as discussed above.

This FIG. 7 also illustrates two exemplary cracks 138 that are shown propagating through the potting 106 to the barrier provided by the plastic encapsulation body 104'. As may be seen, this plastic encapsulation body 104' provides a barrier from further crack propagation through the potting 106, and therefore prevents further ingress of the environment, such as fuel or explosive gas, to the coil 124.

Figure 8:
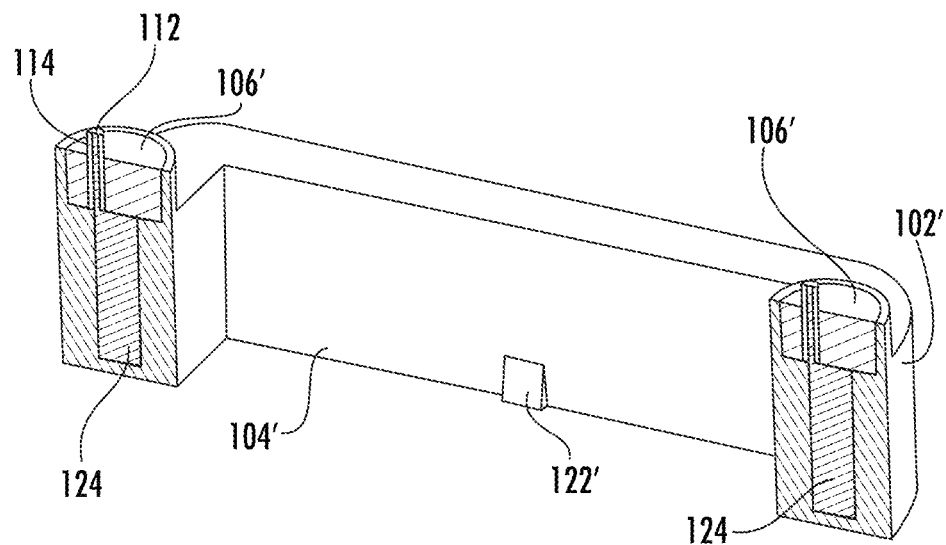
FIG. 8 is a cross-sectional perspective view illustration taken along a longitudinal axis of an alternative embodiment of an enhanced safety coil constructed in accordance with the teachings of the present invention.

A further alternative embodiment is illustrated in the longitudinal cross-section shown in FIG. 8. As may be seen therein, the starting and ending ends of the coil 124, i.e. the end where the starter wire is brought into the plastic encapsulation body 104' at the beginning of the coil 124 windings and the end where the end wire is taken out of the plastic encapsulation body 104' at the end of the coil 124 windings, is enclosed on its bottom and sides by the plastic encapsulation body 104' (and sleeve as optionally used in certain embodiments).

The plastic encapsulation body 104' (and optional sleeve) in this area on these two ends, or on at least the one end in embodiments where both starter and end wires are provided on the same end of the coil 124, forms a potting reservoir that accommodates potting 106' on the top surface of the coil 124 and around the starter and end wires thereof. The circular cylindrical shape of this potting reservoir is a further body de-stress feature that reduces the stress in the potting 106 that could otherwise aid in the formation and propagation of a crack. The depth of such potting 106' may be as discussed above with regard to D, and is preferably at least 3 mm thick to allow for use in explosive environments.

Outside of this potting reservoir, the plastic encapsulation body 104' (and optional sleeve in certain embodiments) have a reduced height compared to the embodiment of FIG. 1. That is, the remainder of the coil 124 is enclosed only by the plastic encapsulation body 104' (and the optional sleeve) which provides a further body de-stress feature. In this embodiment, the top surface of the coil 124 is provided in close proximity of the outside of the plastic encapsulation body 104' to enhance the magnetic coupling to the stator.

The depth below the outside surface may be in accordance with the prior discussion of the width W depending on the application thereof.

Figure 9:
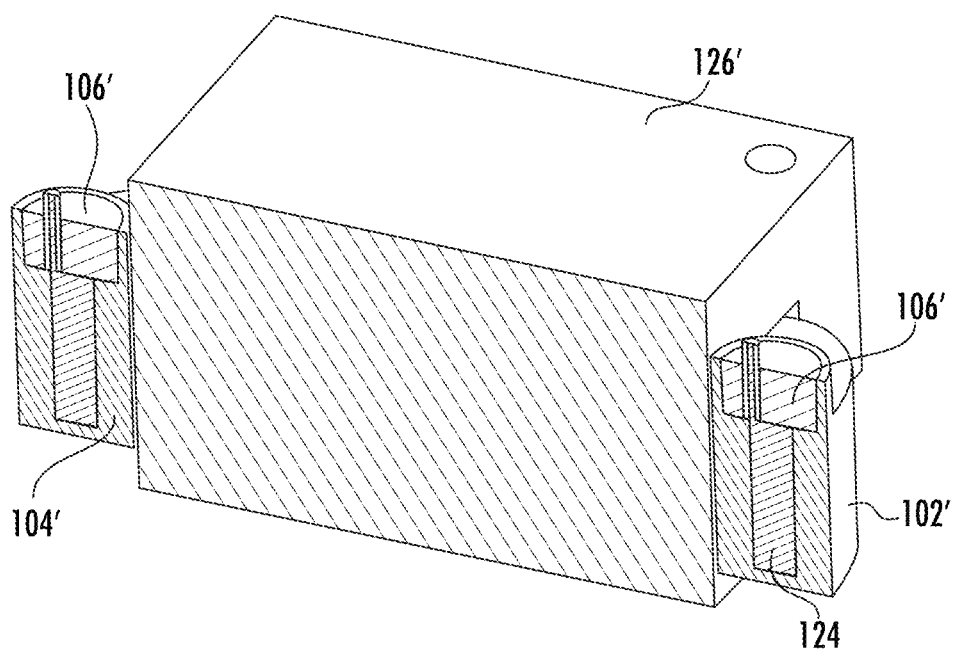
FIG. 9 is a perspective view of the embodiment of the enhanced safety coil of FIG. 8 affixed to a stator for use in a SOGAV.

As illustrated in FIGS. 8 and 9, the plastic encapsulation body 104' and the optional sleeve 102' may be integrated into a single encapsulation, and in certain embodiments may be formed as such. This embodiment also includes a different style retention latch 122' that is used to retain the enhanced safety coil assembly of this embodiment with the stator 126' shown in FIG. 9. This stator 126' is separated from the coil 124 only by the depth of the plastic encapsulation body on its top surface.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What claimed is:

1. An enhanced safety coil for use in a solenoid operated gas admission valve (SOGAV), comprising:
   a plastic encapsulation body having at least one body de-stress feature;
   a coil wound on the plastic encapsulation body;
   a sleeve forming an outermost side protective wall configured to accommodate the plastic encapsulation body and coil therewithin;
   potting provided between the plastic encapsulation body and the sleeve to seal the coil therein; and
   wherein the at least one body de-stress feature is configured to reduce at least one of a formation or a propagation of a crack through the potting to the coil.

2. The enhanced safety coil of claim 1, wherein the at least one body de-stress feature includes rounded corners on an inner side wall of the plastic encapsulation body.

3. The enhanced safety coil of claim 1, wherein the at least one body de-stress feature includes an outline curvature of a transition from side walls of the sleeve to each end walls of the sleeve.

4. The enhanced safety coil of claim 1, wherein the at least one body de-stress feature includes an upper end wall on at least one end of the plastic encapsulation body configured to extend from a top surface of the coil to form an outermost surface displacing the potting that would otherwise cover a top of the coil.

5. The enhanced safety coil of claim 4, wherein the plastic encapsulation body defines at least one port through the upper end wall on the at least one end of the plastic encapsulation body, and wherein the potting fills the port.

6. The enhanced safety coil of claim 5, the coil includes a wire that is positioned within at least one of the at least one port through the upper end wall on the at least one end of the plastic encapsulation body, and wherein the potting fills the port around the wire.

7. The enhanced safety coil of claim 4, wherein the plastic encapsulation body defines two ports through the upper end wall on one end of the plastic encapsulation body.

8. The enhanced safety coil of claim 4, wherein the plastic encapsulation body defines two ports through the upper end wall on both ends of the plastic encapsulation body.

9. The enhanced safety coil of claim 1, wherein the at least one body de-stress feature includes a circular cylindrical potting reservoir that accommodates the potting on a top surface of the coil and around at least one of a starter wire or an end wire of the coil extending therethrough.

10. The enhanced safety coil of claim 1, wherein a thickness of an upper side wall of the plastic encapsulation body over the coil has a reduced thickness sized to provide a barrier wall configured to protect a top of the coil from exposure to a crack that has propagated through the potting above the coil and accommodated between an interior side wall of the plastic encapsulation body that extends above the barrier wall and the sleeve.

11. The enhanced safety coil of claim 10, wherein the thickness of the barrier wall is between about 0.10 mm and 3.5 mm.

12. The enhanced safety coil of claim 11, wherein the thickness of the barrier wall is between about 0.10 mm and 0.75 mm.

13. The enhanced safety coil of claim 1, wherein a thickness of the sleeve is between about 0.10 mm and 3.5 mm.

14. The enhanced safety coil of claim 13, wherein a thickness of the sleeve is between about 0.10 mm and 0.75 mm.

15. The enhanced safety coil of claim 1, wherein the potting has a depth of at least about 3 mm.

16. The enhanced safety coil of claim 1, wherein at least one of the plastic encapsulation body or the sleeve is formed of suitable plastic.

17. The enhanced safety coil of claim 1, wherein the plastic encapsulation body forms retention latches configured to mate with a stator.

18. The enhanced safety coil of claim 1, wherein the potting is also provided between the sleeve and a side of the coil in a thickness $W_P$ to seal the coil therein.

19. The enhanced safety coil of claim 18, wherein the thickness $W_P \geq 0$.

20. The enhanced safety coil of claim 1, wherein the plastic encapsulation body completely encapsulates the coil.

21. The enhanced safety coil of claim 1, wherein the sleeve defines a sleeve reservoir housing forming a potting reservoir at opposite locations around a periphery of the sleeve.

22. A coil for use in a solenoid, comprising:
- an encapsulation body having at least one body de-stress feature;
- a coil wound on the encapsulation body;
- a sleeve forming an outermost side protective wall configured to accommodate the encapsulation body and coil therewithin;
- potting provided between the encapsulation body and the sleeve to seal the coil therein; and
- wherein the at least one body de-stress feature is configured to reduce at least one of a formation or a propagation of a crack through the potting to the coil and includes rounded corners on an inner side wall of the encapsulation body, an outline curvature of a transition from side walls of the sleeve to each end walls of the sleeve, and an upper end wall on at least one end of the plastic encapsulation body configured to extend from a top surface of the coil to form an outermost surface displacing the potting that would otherwise cover a top of the coil.

* * * * *